Oct. 15, 1935.  J. L. ANDERSON  2,017,429

CIRCLE CUTTING OR WELDING MACHINE

Filed Oct. 10, 1933

INVENTOR
BY James L. Anderson
ATTORNEY

Patented Oct. 15, 1935

2,017,429

UNITED STATES PATENT OFFICE 2,017,429

CIRCLE CUTTING OR WELDING MACHINE

James L. Anderson, Closter, N. J., assignor to Air Reduction Company, Incorporated, New York, N. Y., a corporation of New York Application October 10, 1933, Serial No. 692,969

14 Claims. (Cl. 266—23)

This invention relates to circle cutting or welding machines of the type in which a driving wheel running on the work moves a torch-supporting arm in a plane substantially parallel to the work.

It is an object of the invention to provide a particularly simple and useful machine of the type indicated for making circular cuts around a fixed standard, or for cutting along a non-circular path when the driving wheel is guided. Another object of the invention is to provide such a machine for making two circular cuts simultaneously.

Another object is to provide a circle cutting or welding machine with an arm for supporting a torch and a driving wheel, and a floating connection between the arm and a fixed standard which supports the arm.

Other objects, features and advantages of the invention will appear or be pointed out as the description proceeds.

In the accompanying drawing, forming a part hereof:

Figure 1:
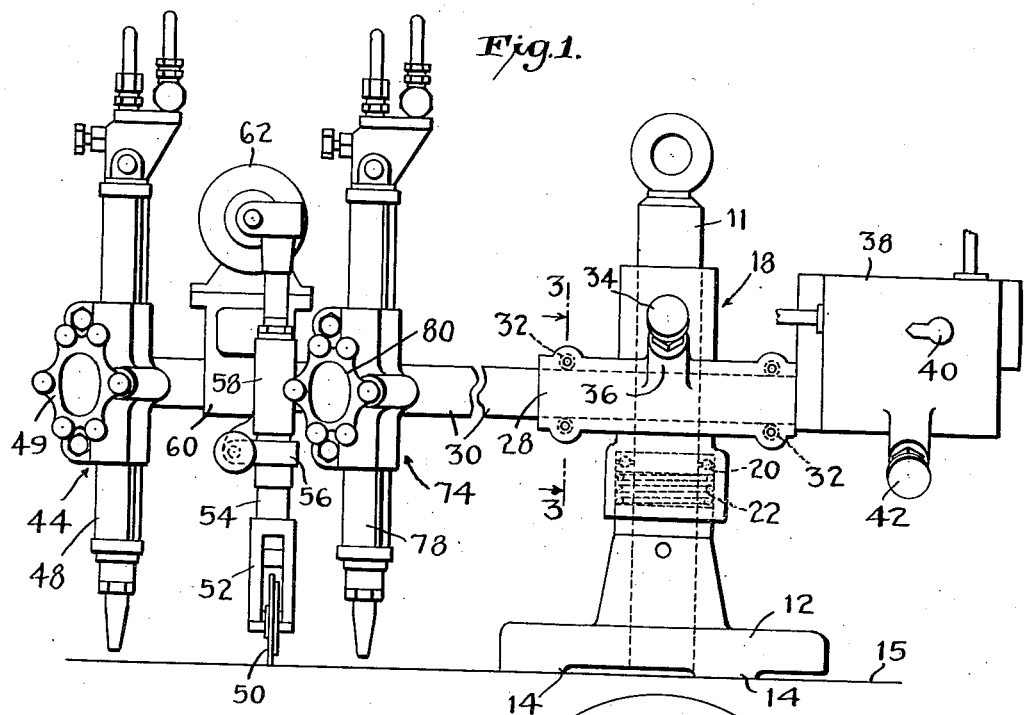
Fig. 1 is a side elevation of a torch cutting machine embodying the invention.
Figure 2:
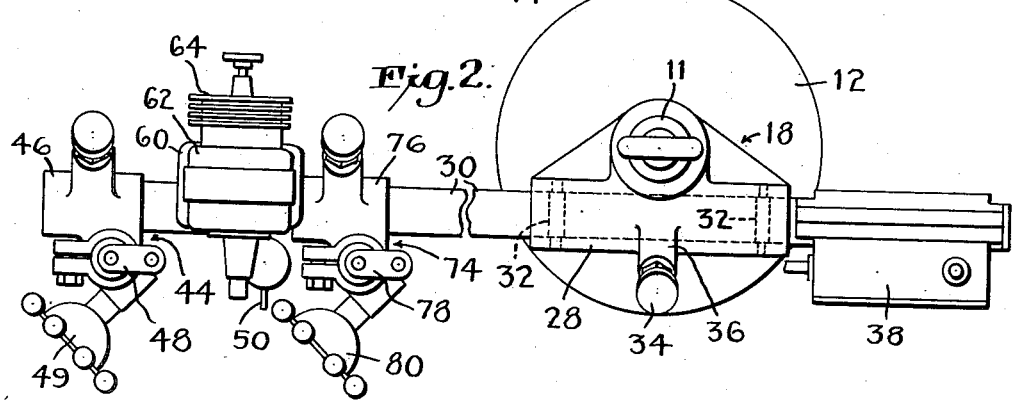
Fig. 2 is a plan view of the machine shown in Fig. 1.
Figure 3:
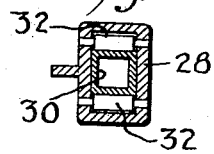
Fig. 3 is a sectional view on the line 3—3 of Fig. 1.

A center post or standard 11 is fastened to a base 12, which has short legs 14 for resting on the work 15 or other supporting surface. There are three legs 14 so that the standard will be stable on any supporting surface.

A frame 18 has a long vertical bearing which fits the center post and slides and turns freely on this post. An anti-friction thrust bearing 20 rests on a spring 22 and supports the frame 18 for floating movement on the center post. The lower end of the spring is supported by the base 12 and the bottom end of the frame 18 is shaped to cover the thrust bearing 20 and spring 22 as a shroud.

The frame 18 has a horizontal portion 28 for supporting an arm or bar 30. This bar is square in cross-section, and passes through the horizontal portion 28 as a bearing. Rollers 32 journaled in the horizontal portion 28 of the frame serve as the anti-friction members for the bearing so that the bar slides lengthwise in the bearing with very little friction.

A clamping screw 34 threads through a boss 36 in the frame 18 and can be screwed down to clamp the bar 30 against sliding movement when cutting circles.

A control box 38, including resistor coils for a motor and a switch 40 for controlling the supply of current to the motor, fits on the rearward end of the bar 30 and is clamped in set position by a clamping screw 42.

A torch holder 44 is fastened to the forward portion of the bar 30 by a clamp 46. A cutting torch 48 is carried by the torch holder 44 and can be moved up or down in the holder by a hand-wheel 49 which operates conventional rack and pinion mechanism.

A traction or driving wheel 50 runs on the work and has an axle connected to a yoke 52, which is secured to a sleeve 54. This sleeve extends up through a clamp 56 and vertical bearing 58, which are parts of a frame 60. A motor 62 is carried by the frame 60, and this frame is securely clamped to the bar 30. Driving connections extend from the motor 62 to the driving wheel 50, and the speed of the motor is controlled by a governor 64. The construction of this driving mechanism is similar to that shown in Patent 1,735,129, dated November 12, 1929, except that the sleeve 54 has no floating movement with respect to bar 30, and the frame 60 includes the clamp 56, by means of which swivel movement of the yoke 52 and driving wheel 50 can be prevented.

A second torch holder 74 has a clamp 76 for securing it in set position on the bar 30. A cutting torch 78, carried by the torch holder 74, can be moved toward and from the work by conventional rack and pinion mechanism operated by a hand-wheel 80.

The two torches 48 and 78 are used for making simultaneous circular cuts when cutting rings. The torches are spaced by a distance equal to the radial width of the ring, and the bar 30 is moved lengthwise in the horizontal portion 28 of the frame 18 until the distance of the torch 48 from the axis of the center post is equal to the outer radius of the ring.

The clamping screw 34 is then turned to clamp the bar 30 in set position and the clamp 56 is set to hold the driving wheel 50 in a tangential plane. The governor 64 is adjusted to give the driving wheel a speed over the work somewhat greater than the cutting speed of the torch 78 and less than that of the torch 48. Because of its greater distance from the axis of rotation, the torch 48 travels faster than the torch 78 and it must be capable of cutting at this higher speed.

When a non-circular path is to be cut, only one torch is ordinarily employed. The clamping screw 34 is released so that the bar 30 is free to move lengthwise on the anti-friction rollers 32. The clamp 56 is also released and the yoke 52 is swiveled manually to guide the driving wheel 50 along the desired path. The path followed by the torch 5 is not the same as that followed by the driving wheel because the torch is spaced some distance from the driving wheel and therefore moves with a different radius of curvature from the driving wheel on all turns in the path. When laying 10 out a non-circular path for the driving wheel, allowance is made for this difference in the radius of curvature. Cuts can also be made by laying out the path of the torch on the work and guiding the driving wheel to keep the torch on 15 the path.

The invention has been described as a cutting machine, but welding torches can be substituted for the cutting torches, and other changes and modifications may be made, and various features 20 of the invention can be used alone or in combination with other features, without departing from the invention as defined in the claims.

I claim:

1. A torch cutting or welding machine comprising a fixed standard; a frame supported by the standard and rotatable thereon about an axis normal to the plane of the work; a bar parallel to the plane of the work and supported intermediate its ends for longitudinal movement with respect to said frame by bearing means on the frame adjacent the standard; releasable clamping means on the frame for preventing longitudinal movement of the bar; and a driving wheel connected with the bar in position to run on the surface of the work and rotate the bar about said axis normal to the work.

2. A circle cutting or welding machine comprising a fixed standard; a radius arm pivotally connected with said standard; two torch holders releasably fastened in set positions on the radius arm; spaced from each other and from the standard to cut or weld along arcs of different radii; and driving mechanism connected with said radius arm for rotating said arm about the standard as a center, said driving mechanism including a traction wheel in position to run on the surface of the work along an arc having a radius intermediate in length between the radii described by the torches.

3. A torch cutting or welding machine comprising a fixed standard; a frame supported by the standard and rotatable thereon about an axis normal to the plane of the work; a bar extending through the frame, adjacent the standard, parallel to the plane of the work and slidable lengthwise in the frame; torch holding means and driving mechanism connected with the portion of the bar which extends from the front side of the frame, said driving mechanism including a motor driven traction wheel for running on the surface of the work; and control means for the motor carried by the portion of the bar which extends from the rear side of the frame.

4. A torch cutting or welding machine comprising a fixed standard; a frame rotatably supported by the standard; a bar extending through the frame and beyond the standard in both directions, bearing means on the frame on which said bar is slidable lengthwise with respect to the frame; torch holding means connected with the bar; driving mechanism including a traction wheel for running on the surface of the work to move the torch holder across the work; and means swivelly connecting the traction wheel with the bar so that the wheel can be steered to guide the torch holder in any and changing directions parallel to the plane of the work.

5. In a torch cutting or welding machine, a bar of rectangular cross-section; a torch holder with a clamp fitting the bar for keeping the torch holder in set position along the bar; a motor driven traction wheel swivelly connected with the bar and adapted to run on the surface of the work in any and changing directions; bearing means for preventing the bar from turning transversely and for supporting it for lengthwise sliding movement; and means supporting said bearing for pivotal movement about a fixed standard.

6. A torch cutting or welding machine comprising a bar; a torch holder supported by the bar; driving mechanism supporting the bar and including a traction wheel for running on the surface of the work; a frame through which the bar passes and in which it can move lengthwise; and a fixed standard supporting the frame intermediate the ends of the bar for pivotal movement and floating movement normal to the work as the traction wheel passes over an uneven surface of the work.

7. A torch cutting or welding machine comprising a standard; a frame movable on the standard with a rotary movement about a vertical axis and with a floating movement lengthwise of the vertical axis; a horizontal bar passing through a bearing on the frame adjacent the standard and movable lengthwise in the bearing; a torch holder carried by the bar for universal movement in a plane; and driving mechanism including a traction wheel supporting the bar and swivelly connected with the bar so that said wheel can be steered to guide the torch holder along a predetermined path.

8. In a torch cutting or welding machine, a center post; a radius arm for carrying a torch; means connecting the radius arm to the center post including a bearing movable axially on the center post for floating action of the radius arm toward and from the work; spring means supporting said bearing and the radius rod to assist the floating action of said bearing; and driving mechanism for rotating the radius arm around the center post.

9. A circle cutting or welding machine comprising a fixed center post; a frame supported for rotary and floating movement on the center post during the operation of the machine; a radius arm connected with the frame; a driving wheel supporting one end of the radius arm remote from the frame; and mechanism for operating the driving wheel to rotate the radius arm and frame about the center post.

10. In a torch cutting or welding machine, a fixed standard; a radius arm connected with the standard for rotary movement around said standard as a center and for floating movement axially on said standard during the operation of the machine; a driving wheel connected with the radius arm near one end of the arm; a torch holder supported by the driving wheel; and mechanism for operating the driving wheel to move the torch holder in a circle around the standard.

11. In a torch cutting or welding machine, a fixed standard; a radius arm connected with the standard for rotary movement around said standard as a center and for floating movement axially on said standard during the operation of the machine; a driving wheel in position to run on the surface of the work to be cut; means connecting the driving wheel with the radius arm; and a torch holder for supporting a torch in position to deliver a cutting jet against the work close to the driving wheel.

12. A circle cutting or welding machine comprising a fixed center post; a frame supported for rotary and floating movement on the center post during the operation of the machine; a radius arm passing through a bearing in the frame close to the center post and movable lengthwise in said bearing to regulate the distance between one end of the arm and the axis of the center post; a driving wheel supporting said end of the radius arm; and mechanism for operating the driving wheel.

13. In a torch cutting or welding machine, a fixed standard including a center post and three legs for contact with a supporting surface; a frame movable axially and rotatably on the center post during the operation of the machine; a radius arm connected with the frame and movable lengthwise to change the radius to be cut; a driving wheel connected to and supporting the radius arm; and a torch holder carried by said arm.

14. A circle cutting machine comprising a fixed standard, a frame rotatably supported by the standard, said frame having an opening of rectangular cross-section therethrough, a radius bar of rectangular cross-section extending through the opening and movable lengthwise on bearing means in said opening to change the length of the bar projecting from the opposite ends of said opening, releasable clamping means for holding the bar against sliding movement in the frame, a torch holder fixed on the bar, and driving mechanism for rotating the bar and frame about the standard, said driving mechanism including a traction wheel running in the work and connections between the wheel and bar of such a nature that at least one end of the bar is supported by said traction wheel.

JAMES L. ANDERSON.